United States Patent [19]

Treffry-Goatley et al.

[11] Patent Number: 4,770,793
[45] Date of Patent: Sep. 13, 1988

[54] DEWATERING SLURRIES

[75] Inventors: Kevin Treffry-Goatley, Pinetown; Christopher A. Buckley, Durban, both of South Africa

[73] Assignee: The Water Research Commission, Pretoria, South Africa

[21] Appl. No.: 7,499

[22] Filed: Jan. 28, 1987

[30] Foreign Application Priority Data

Jan. 31, 1986 [ZA] South Africa ............... 86/0731

[51] Int. Cl.[4] ............................................ B01D 29/38
[52] U.S. Cl. .................................. 210/769; 210/791; 210/108; 210/196; 210/386; 210/411
[58] Field of Search ............... 210/769, 791, 808, 86, 210/106, 109, 409, 410, 407, 636, 97, 194, 196, 386, 411, 108

[56] References Cited

U.S. PATENT DOCUMENTS 2,861,649 11/1958 Junkman ........................ 183/61
3,523,077 8/1970 Camirand et al. ............... 210/65
4,282,097 8/1981 Kuepper et al. ................. 210/409

FOREIGN PATENT DOCUMENTS 79040 5/1983 European Pat. Off. .
122439 10/1984 European Pat. Off. .
WO86/05413 9/1986 PCT Int'l Appl. .

Primary Examiner—Frank Sever
Attorney, Agent, or Firm—Robert R. Jackson

[57] ABSTRACT

In a slurry dewatering process, slurry is pumped into a porous tube at a sufficiently low velocity for laminar flow conditions to exist. The pressure is sufficiently high for liquid in the slurry to permeate outwardly through the tube wall and for solids in the slurry to be deposited in the form of an annular cake on the tube wall. The deposition of solids is controlled so that the cake thickness is substantially uniform throughout. When a predetermined thickness of cake has been deposited, the pressure inside the tube is decreased and the flow velocity is increased and the cake is dislodged from the tube wall in flake form and is conveyed downstream for collection on a screen or the like.

14 Claims, 2 Drawing Sheets

4,770,793

DEWATERING SLURRIES

BACKGROUND TO THE INVENTION

This invention relates to a slurry dewatering process and apparatus which uses a tubular filter press.

In one known slurry dewatering apparatus, slurry which is to be dewatered is pumped at low velocity into a rigid, perforated tube. The liquid in the slurry permeates outwardly through the perforations in the tube wall and the suspended solids build up inside the tube to form a solid cylindrical plug which is "extruded" from the tube in the form of an elongate "sausage" under the effects of pressure exerted on it by incoming slurry. Because of its highly compact nature, the "sausage" cannot easily be dried further and it is usually necessary to break up the "sausage" to increase its specific surface area. This is clearly not desirable.

It is an object of this invention to provide a slurry dewatering process and apparatus which has a high throughput and which has the facility for easy removal and subsequent drying of accumulated solids.

SUMMARY OF THE INVENTION

A first aspect of the invention provides a slurry dewatering process which includes a cake deposition stage and a cake dislodgement and removal stage, wherein the cake deposition stage comprises the steps of: pumping slurry which is to be dewatered into a porous tube at a sufficiently low velocity for laminar flow conditions to prevail in the tube and at a sufficiently high pressure for liquid in the slurry to permeate outwardly through the tube and for solids in the slurry to be deposited on the internal tube surface to form an annular layer of cake on that internal surface, and controlling the deposition of the solids so that the cake layer which is formed is even or nearly even thoughout;

and wherein the cake dislodgement and removal stage comprises the steps of: decreasing the pressure and increasing the flow velocity in the tube when a predetermined cake thickness has been deposited on the internal tube surface, dislodging the cake from the internal tube surface in the form of discrete particles and conveying the dislodged cake downstream in the tube.

A second aspect of the invention provides a tubular filter press apparatus for dewatering slurries which includes at least one porous tube, means for introducing slurry which is to be dewatered into the tube, means for controlling the slurry flow velocity in the tube during a cake deposition stage such that laminar flow conditions prevail and for establishing a sufficiently high pressure in the tube for liquid in the slurry to permeate outwardly through the tube and for solids in the slurry to be deposited on the internal tube surface to form an annular layer of cake on that surface, means for controlling the deposition of solids on the internal tube surface so that the cake layer is even or nearly even throughout, means for decreasing the pressure in the tube and for increasing the velocity of flow in the tube once a predetermined thickness of cake has been deposited on the internal tube surface, and means for dislodging the cake from the internal tube surface in the form of discrete particles, the dislodged cake then being conveyed downstream in the tube by the increased velocity flow.

Preferably the process and apparatus also include the facility for capturing the dislodged cake i.e. for separating it from the conveying liquid.

BRIEF DESCRIPTION OF THE DRAWINGS

The invention will now be explained in more detail, by way of example, with reference to the accompanying drawings in which.

DESCRIPTION OF EMBODIMENTS

Figure 1:
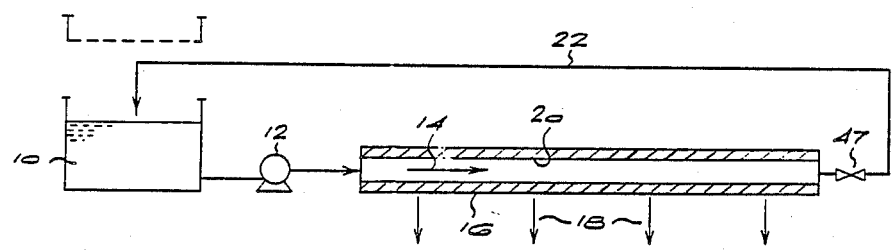
FIG. 1 shows an apparatus according to the invention in the cake formation mode.

The various stages in the process of the invention are: cake deposition, cake dislodgement and removal and cake capture. FIG. 1 illustrates cake deposition.

Referring to FIG. 1, the slurry 10 which is to be dewatered is stored in a feed tank and is pumped by means of a pump 12 in the direction of the arrow 14 into a parallel array of microporous flexible filter tubes indicated schematically by the reference numeral 16. A return line 22 extends from the downstream ends of the filter tubes and includes a back-pressure valve 47. The valve 47 is either closed completely, in which case the apparatus operates in a dead-end mode, or is maintained slightly open to permit low velocity flow through the tubes. Instead of a partially open valve, a flow restricting orifice can be provided.

It is essential during cake deposition that the slurry be pumped into the tube array under laminar flow conditions. The flow velocity is therefore kept extremely low, possibly as low as 0.01 to 0.05 m/s. The pressure of the slurry in the tubes 16 is maintained at a high level by the action of the valve 47 and is typically in the range 50 to 1000 kPa.

Filtrate permeates outwardly through the walls of the filter tubes as indicated by the arrows 18 in FIG. 1. The solids accumulate on the internal surfaces of the tubes 16 to form a cake layer 20. It is important that the cake layer be kept as even as possible as it builds up. In general, the cake thickness will be fairly uniform throughout because of the low pressure gradient in the tubes 16 resulting from the low velocity flow. Even if a section of a tube does develop relatively thin cake layer, the permeability will be greater in that section and the cake deposition will accordingly be higher to rectify the situation and restore even cake distribution.

Cake evenness can be promoted further by periodically opening the valve 47 fully for short bursts, typically for 5 seconds every 5 to 10 minutes. This technique, which is referred to subsequently in this specification as "blow-down", has the effect of preventing excessive cake build-up at the upstream end of the tubes, of preventing more build-up from taking place in some tubes than in others and of evening out the cake distribution. The blow-down technique is used in dead-end operation of the apparatus i.e. during operation when the valve 47 is normally completely closed. During blow-down the velocity of the slurry is typically increased to 0.5 to 2 m/s.

Alternatively, in a case where the valve 48 is kept slightly open or a restrictive orifice is provided, the continuous, low velocity circulation of slurry via the return line 22 (as illustrated in FIG. 1) is sufficient to promote even cake deposition. Once again, the effect of low velocity, laminar flow is to prevent excessive cake build-up at the upstream end of the tubes. As stated above, it is important that cake deposition be as even as possible. Uneven cake deposition can result in the formation of solid plugs which can be difficult to dislodge.

The thickness of the cake during the cake deposition stage of FIG. 1 is continuously monitored, and the deposition stage is usually terminated when the cake thickness reaches about 25% of the internal diameter of the tubes. A simple technique for monitoring the cake thickness involves monitoring the filtration rate, the assumption being that there is an approximate relationship between cake thickness and filtration rate. The filtration rate can, for instance, be monitored by observing the rate of fall of the slurry in the storage tank using level sensors or the like.

Once the cake deposition stage has been terminated, the cake dislodgement and removal stage is commenced. FIGS. 2 to 5 each illustrate a different cake dislodgement and removal technique contemplated within the scope of the present invention. In each of the techniques, which are described in detail below, the pressure in the tubes is reduced to between 10 and 100 kPa and the flow velocity is increased to between 1 and 3 m/s, the exact parameters of pressure and velocity which are used being dependent on the particular dislodgement technique, the particular slurry being dewatered and on the nature of the cake particles which are produced during the dislodgement stage.

Figure 2:
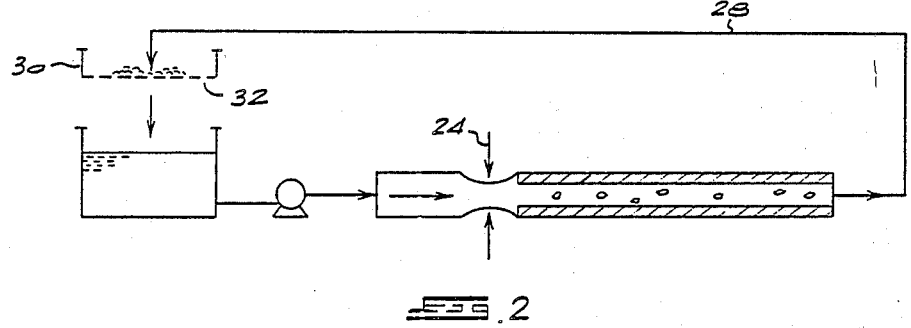
FIG. 2 shows cake removal by spray cleaning.

FIG. 2 shows a technique which makes use of high pressure fluid sprays 24 which are directed against the exterior surfaces of the tubes in the array. The spray nozzles are carried by a header (not shown) which moves along the length of the tubes in the direction of bulk flow. Although less preferred it is also possible to move the header in the direction opposite to that of the bulk flow. In one embodiment, the sprays are water sprays having a spray angle of 60° to 80° and a nozzle aperture of 1 mm and are operated at between 1 to 5 MPa and a water flow rate of 2 to 3 l/min at a distance of approximately 10 mm from the tubes.

In the FIG. 2 case, the internal tube pressure should be low, typically about 10 kPa. The fluid sprays have the effect of deforming the tubes to some extent to dislodge the accumulated cake from the internal tube surfaces. The dislodged cake, which is dislodged in the form of small flakes, is conveyed downstream by the bulk slurry flow in the tubes.

Figure 3:
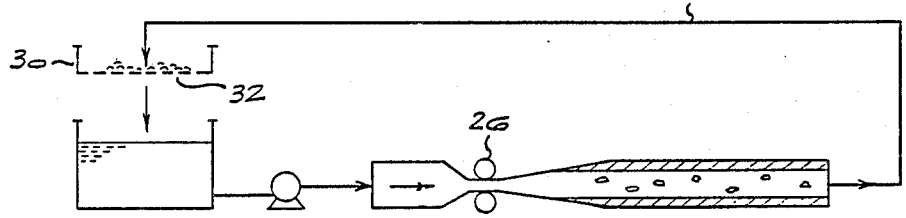
FIG. 3 shows cake removal by external rollers.

FIG. 3 shows a technique in which the cake is dislodged using opposing rollers 26 the spacing between which is chosen to pinch the tubes almost closed. The result is a localised zone of high flow velocity in the pinched zone and deformation of the tube in the region at and downstream of the rollers. The venturi effect created by the pinched zone gives rise to a low pressure in the tubes just downstream of the rollers. The cake is sucked off the internal surfaces of the tubes and is conveyed downstream by the bulk flow. The pressure reduction at the pinched zone may be sufficient to suck ambient air inwardly through the tube walls to assist in disloding the cake.

Even if the roller spacing is not small enough to create a significant pressure reduction in the tubes, the local tube deformation and consequential increased flow velocity can be sufficient to cause cake dislodgement.

Note that the rollers need not be round and that pinching of the tubes can be achieved by other non-rolling bodies applied to opposite sides of the tubes.

Figure 4:
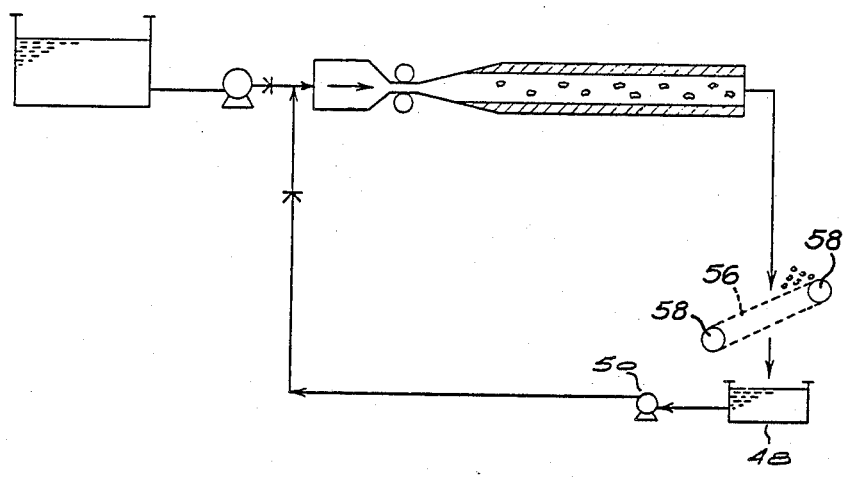
FIG. 4 shows a system for cake capture.

The technique illustrated in FIG. 4 differs from that of FIG. 3 in that it is not the bulk slurry flow which transports the dislodged cake downstream in the tubes, but flow of process filtrate which is pumped from a tank 48 by means of a pump 50. Note that any other suitable liquid could be used to transport the dislodged cake instead of the process filtrate, the creation of which is described in more detail below.

In FIG. 5, there is again a zone of reduced pressure which is created in this case by means of a bobbin 52 which is fed on a wire 54 through each tube in the array in the bulk flow direction. The bobbin has a diameter which is slightly less than the internal tube diameter. The reduction in cross-sectional area available to flow results in a velocity increase and a pressure reduction. In the illustrated case, the tubes are flexible tubes which deform slightly just downstream of the bobbin. The combined effects of tube deformation and pressure reduction dislodge the cake from the tube walls for conveyance downstream by the bulk flow.

Figure 5:
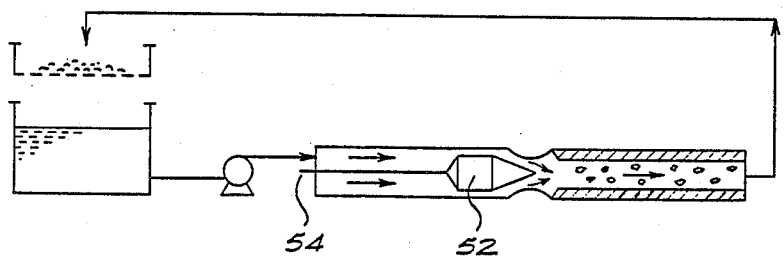
FIG. 5 shows cake removal using an internal bobbin.

It will be appreciated that the technique of FIG. 5 can also be used in cases where the tubes are not flexible, the bobbin in this case stil causing a pressure reduction which will dislodge the cake. Accordingly, the technique of FIG. 5 is also applicable to dislodgement of cake from rigid, perforated tubes.

Yet another technique for dislodging the cake from flexible tube walls involves rapid pulsing of the flow in the tubes. When the tubes are subjected to full flow, they have a circular shape as is explained below with reference to FIGS. 6 and 7. However, if the flow is stopped or reduced, the tubes will deform under the weight of the slurry which they contain and this deformation will dislodge cake from the internal tube walls for downstream conveyance in the bulk slurry flow.

Note that the technique of FIG. 2 can be used simultaneously with the other techniques described above for cake dislodgement.

An important advantage of the invention is the fact that the cake is dislodged from the tube walls in the form of fine flakes as opposed to a solid plug. In a typical application of the invention, the flakes will have dimensions of $3 \times 10 \times 5$ mm, although this will of course depend on the actual properties of the suspended solids in the slurry. The fact that the cake is dislodged in flake form facilitates drying of the cake after the cake capture stage.

Cake which is dislodged from the tube walls and removed from the tubes is captured during the cake capture stage of the process. FIGS. 2 and 3 show how the bulk flow is returned during this stage along a line 28 to a screening device 30 which includes a mesh screen 32. The screen 32 is located above the feed tank and the dewatered cake collects on top of the screen while filtrate passes through into the feed tank. The mesh aperture may typically be about 1 mm.

FIG. 4 illustrates an alternative cake collection system in which there is a perforated endless conveyor belt 56 passing around rollers 58. the bulk flow with entrained cake is deposited onto the belt and the filtrate passes through into the tank 48 referred to previously. The dewatered cake itself is conveyed by the conveyor to a suitable discharge and collection point.

Other cake capture systems which are not illustrated may involve the use of hydrocyclones, centrifuges or gravity settling tanks.

Figures 6, 7, 8:
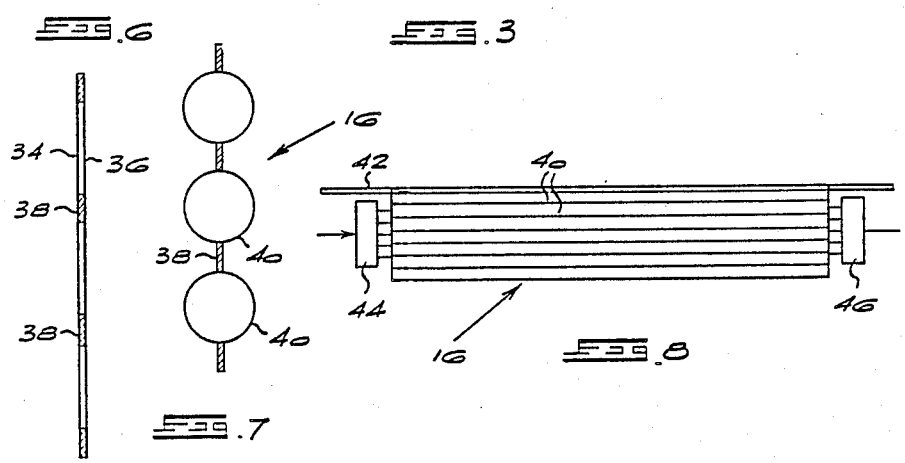
FIGS. 6 and 7 show a filter tube array in inoperative and operative conditions respectively.
FIG. 8 shows how the array of FIGS. 6 and 7 can be suspended.

Reference is now made to FIGS. 6 to 8 which illustrate a typical array of flexible tubes. Sheets 34 and 36 of flexible filter material are seamed by sewing, bonding or weaving at spaced locations 38. The flexibility of the sheets enables them, when filled with slurry during operation, to assume the shapes seen in FIG. 7 defining an array or curtain of parallel, flexible tubes 40 of circular cross-section. FIG. 8 shows how the array or curtain of tubes 40 can be suspended vertically from a horizontal rail 42 supported at its ends by a fixed structure (not shown). FIG. 8 also shows upstream and downstream manifolds 44 and 46 are connected to the tube ends.

Typically the tubes will have a diameter between 20 and 40 mm and it should be noted that the tube array can be formed by securing a series of independent tubes to one another instead seaming flat sheets 34 and 36 as shown in FIG. 6. It should also be noted that the array need not necessarily hang vertically is in FIG. 8, other orientations also being possible.

Furthermore, the invention is also applicable to single tubes which are not combined with other tubes in an array.

Any one of a wide variety of different natural and synthetic materials can be used for the tubes or sheets 34 and 36.

The process and apparatus described above can be used in a wide variety of applications such as the dewatering of aluminium hydroxide, lime, polyelectrolyte and polyelectrolyte/bentonite slurries resulting from the production of potable water and kaolinite slurries. It is also believed that the process and apparatus could be used to good effect in the dewatering of metallurgical slurries resulting from mining and mineral recovery operations. It will however be appreciated that the invention is limited in its application to slurries in which the suspended solids have cohesive properties. Solids such as beach sand, which have no cohesive properties, would not form a cake on the tube walls.

EXAMPLE 1

In this example a prototype plant was used to dewater a slurry composed of polyelectrolyte/bentonite/surface water and organic matter. The tube array was formed of polyester multi-filament sheets seamed together with 8.5 mm wide seams to form twenty tubes of length 10 m and diameter 25 mm. The total filtration area per array was 15.7 m$^2$. The blow-down technique was used during the deposition stage. During the cake dislodgement or removal stage, either rollers or water sprays were used. The dislodged cake was conveyed in the tubes by process filtrate as indicated in FIG. 4, the cake being captured on a perforated belt in the manner depicted in that Figure.

The results of five separate tests are tabulated in Table 1 below.

| Parameter | Units | Test No. 1 | 2 | 3 | 4 | 5 |
| --- | --- | --- | --- | --- | --- | --- |
| (a) Feed slurry suspended solids | g/l | 13,9 | 43,2 | 53,6 | 6,4 | 10,0 |
| (b) Filtrate suspended solids | g/l | — | Less than 0,05 | Less than 0,05 | 0,13 | 0,10 |
| (c) Cake total solids (dry solids/wet cake) | mass % | 30,5 | 35,7 | 38,8 | 29,9 | 30,0 |
| (d) Operation during cake deposition: | | | | | | |
| Blow-down operation | | Used | Used | Used | Used | Used |
| Frequency | min. | 5 | 6 | 5 | 8 | 5 |
| Duration | s | 20 | 10 | 10 | 30 | 10 |
| (e) Filtration rate: | | | | | | |
| Start batch | l/m$^2$h | 113 | — | — | 278 | 300 |
| End batch | l/m$^2$h | 67 | 69 | 38 | 89 | 43 |
| Average Volume processed | l | 669 | 223 | 332 | 1580 | 1800 |
| Batch time | min. | 30 | 12 | 22 | 55 | 47 |
| Operating pressure | kPa. | 500 | 500 | 450 | 400 | 450 |
| (f) Cake dislodging and conveying: | | | | | | |
| 1. Roller | | Used | Used | Used | Used | Not used |
| Roller outside diameter | mm | 21,3 | 21,3 | 21,3 | 21,3 | — |
| Internal tube | mm | 2,6 | 2,6 | 3,1 | 1,9 | — |
| 2. Water Spray | | Not used | Not used | Not used | Not used | Used |
| Nozzle orifice diameter | mm | — | — | — | — | 0,9 |
| Operating pressure | MPa | — | — | — | — | 3,5 |
| Spray angle | deg. | — | — | — | — | 80 |
| Conveying fluid rate | l/s/tube | 0,75 | 0,75 | 0,75 | 1,0 | 0,75 (Pulsed) |
| Cleaning head traverse rate | m/min | 5 | 5 | 5 | 6,5 | 5 |
| (g) Cake distribution results | | Near even cake distribution | Near even cake distribution | Near even cake distribution | Near even cake distribution | Near even cake distribution |

-continued

| Parameter | Units | Test No. 1 | 2 | 3 | 4 | 5 |
|---|---|---|---|---|---|---|
| (h) Cake thickness | mm | 2 to 3 | 2 to 3 | 3 to 5 | 2 to 3 | 2 to 3 |
| (i) Cake dislodging and removal | | Complete | Complete | Complete | Complete | Complete |

The example illustrates that a high throughput was obtained and that cake dislodgement and removal from the internal tube walls was successful.

EXAMPLE 2

In this example a prototype plant was constructed for dewatering an aluminium hydroxide/polyelectrolyte river silt slurry resulting from the treatment of surface waters to produce potable water. The filter array was identical to that used in the first example. Control of cake evenness during the cake deposition stage was controlled by recircling slurry in the manner depicted in FIG. 1. Cake dislodgement was achieved using a double roller device comprising a first pair of rollers and, slightly downstream of the first pair, a second pair of rollers. The rollers of the first pair had a diameter of 33.4 mm while those of the second pair had a diameter of 21.3 mm. The internal spacing created by the rollers was 2 mm in the case of the first pair and 5 mm in the case of the second pair.

The cake was captured using a 1 mm square mesh screen.

With a feed slurry concentration of 15 g/l, a slurry recycling velocity of between 0.05 and 0.1 m/s and a cake conveyance velocity of 1.5 m/s, good cake distribution and good cake dislodgement and removal were achieved after the cake had attained a thickness of up to 5 mm.

Besides the fact that the captured cake is in flaky form, the invention leads to other advantages when compared with the conventional system referred to previously in which a "sausage" or solid plug of cake is formed in the tubes. With the invention, the cake layer which is formed is relatively thin and therefore permits high filtration rates. In the known system, the solid plug detrimentally affects the filtration rate. Furthermore the plug which is formed in the known system can be extremely difficult to remove from the tube while with the invention cake dislodgement is achieved with relatively simple equipment. Also, the cake deposition controls proposed by the present invention are simple in nature and do not require involved manifolds or other pipework.

We claim:

1. A method comprising: dewatering a slurry composed of a suspension of solid particles having cohesive properties in a liquid by,
    (a) in a cake deposition stage, the steps of providing laminar flow of the slurry by pumping the slurry into a porous tube at a sufficiently high pressure for liquid to permeate outwardly through the pores in the tube, permitting solid particles in the slurry to build up continuously on the internal surface of the tube to form a cohesive annular cake layer on that internal surface, the rate of outward permeation of the liquid decreasing continuously with time as the annular cake layer builds up, controlling the deposition of the solid particles so that the annular cake layer is even or nearly even over the length of the tube, and continuing the cake deposition stage until such time as a predetermined thickness of cake has built up on the internal surface of the tube; and
    (b) in a cake dislodgement and removal stage performed after the predetermined thickness of cake has built up on the internal surface of the tube, decreasing the pressure and increasing the flow velocity in the tube, dislodging the annular cake by creating a localized zone of further reduced pressure within the tube and causing that localized zone to move from substantially one end to the other along the length of the tube sufficient to separate the cake from the internal surface of the tube in the form of flakes composed of solid particles cohering together, and permitting flow through the tube to convey the dislodged flakes downstream and out of the tube.

2. The method claimed in claim 1 wherein the tube is flexible and wherein the cake is dislodged from the internal surface of the tube in flake form by applying a local inward deformation to the tube, thereby to create a localized venturi effect therein, and causing or allowing the local inward deformation to move along the length of the tube.

3. The method claimed in claim 2 wherein the local inward deformation is applied to the tube by means of external liquid sprays directed locally against the exterior surface of the tube.

4. The method claimed in claim 2 wherein the local deformation is applied to the tube by means of external pinching means forced locally against the exterior surface of the tube.

5. The method claimed in claim 1 wherein the tube is flexible or rigid and wherein the cake is dislodged from the internal surface of the tube in flake form by causing or allowing a bobbin smaller in diameter than the tube to pass along the length of the tube.

6. The method claimed in claim 1 wherein the deposition of solid particles is controlled by periodically blowing down during the cake deposition stage.

7. The method claimed in claim 1 wherein the deposition of solids is controlled by recirculating slurry at low velocity through the tube during the cake deposition stage.

8. The method claimed in claim 1 wherein the method is operated during the cake deposition stage in a barrier flow mode in which a valve downstream of the tube is closed or a downstream flow restriction is provided.

9. A through-flow filter press apparatus comprising: means for dewatering a slurry composed of a suspension of solid particles having cohesive properties in a liquid, said means including,
    (a) at least one porous tube;
    (b) means for providing laminar flow, of said slurry, including, pump means for pumping the slurry into the tube at a sufficiently low velocity for laminar flow conditions to prevail in the tube and at a sufficiently high pressure for liquid in the slurry to permeate outwardly through the pores of the tube and for particles in the slurry to build up continuously on the internal surface of the tube to form a cohesive annular cake on the internal surface, with the result that the rate of outward permeation of the liquid reduces continuously with time as the cake builds up;

(c) means for controlling the deposition of particles in the internal surface of the tube so that the cake which is built up has an even or nearly even thickness over the length of the tube;

(d) means operable after a predetermined thickness of cake has built up on the internal surface of the tube to reduce the pressure and increase the flow velocity within the tube; and (e) means thereafter for creating a localized zone of further reduced pressure within the tube, including means for enabling movement thereof along the length from substantially one end to the other of the tube to move the localized zone along the length of the tube sufficient for causing the cohesive cake is to be dislodged from the internal surface of the tube in the form of flakes composed of particles cohering together, the dislodged flakes being conveyed downstream out of the tube in the slurry flow.

10. The through-flow filter press apparatus claimed in claim 9 wherein the means which create a localized zone of further reduced pressure within the tube comprise means for applying a local, inward deformation to the tube.

11. The through-flow filter press apparatus claimed in claim 10 wherein the tube is flexible and wherein the means for applying a local, inward deformation to the tube comprises external liquid sprays directed against the external surface of the tube.

12. The through-flow filter press apparatus claimed in claim 10 wherein the tube is flexible and wherein the means for applying a local, inward deformation to the tube comprises means for applying a localized pinching action to the tube.

13. The through-flow filter press apparatus claimed in claim 9 comprising a bobbin having an external diameter less than the internal diameter of the tube, the bobbin being passable along the length of the tube.

14. The through-flow filter press apparatus claimed in claim 9 comprising a valve or flow restriction means downstream of the tube.

* * * * *

UNITED STATES PATENT AND TRADEMARK OFFICE
CERTIFICATE OF CORRECTION

PATENT NO. : 4,770,793
DATED : September 13, 1988
INVENTOR(S) : Kevin Treffry-Goatley et al.

It is certified that error appears in the above-identified patent and that said Letters Patent is hereby corrected as shown below:

| Column | Line | |
|--------|------|---|
| 2 | 4 | After "accompanying" insert --schematic--. |
| 2 | 65 | Change "48" to --47--. |
| 5 | 21 | Change "is" to --as--. |
| 9 | 19 | Delete "is". |

Signed and Sealed this

Twenty-fifth Day of June, 1991

Attest:

HARRY F. MANBECK, JR.

Attesting Officer

Commissioner of Patents and Trademarks